April 12, 1966  E. N. MATTAUSCH  3,245,278
TRANSMISSION
Filed May 29, 1963  2 Sheets-Sheet 1

INVENTOR.
Edwin N. Mattausch
BY
A. M. Heiter
ATTORNEY

April 12, 1966 E. N. MATTAUSCH 3,245,278
TRANSMISSION
Filed May 29, 1963 2 Sheets-Sheet 2

INVENTOR.
Edwin N. Mattausch
BY
A. M. Heiter
ATTORNEY

United States Patent Office 3,245,278
Patented Apr. 12, 1966

3,245,278
TRANSMISSION
Edwin N. Mattausch, Wayne, Mich., assignor to General Motors Corporation, Detroit, Mich., a corporation of Delaware
Filed May 29, 1963, Ser. No. 284,161
7 Claims. (Cl. 74—333)

This invention relates to a transmission and more particularly to a lock of preventing disengagement of a drive ratio in the transmission.

It has been the experience of operators using manually operated transmissions of the type shown in U.S. Patent 2,435,929, inventor Plexico, to find in some instances after long usage and excessive wear that the transmission jumps out of reverse gear notwithstanding the provision of a spring biased detent. Reverse jump out under loaded conditions can result in abruptly occurring high engine speeds detrimental to the engine and other drive components. The reason for reverse jump out results from the arrangements of the gears which produce axial forces tending to urge the reverse idler gear to its disengaged or neutral position and it has been observed that these axial forces are produced generally by the effective spur gears in reverse which have been excessively worn at their points of sliding engagement or the axial loading which may result from the use of helical gears.

The transmission includes a four speed and reverse gearing assembly and in addition a reverse shifter lever pivotally mounted to the transmission casing having its one end operatively engaging a reverse shifter shaft slidably mounted in the transmission and its other end operably engaging the rotatably and slidably mounted idler gear. To effect reverse gear ratio, a hand lever which has its controlled end operatively engaging the reverse shifter shaft is pivoted to move the reverse shifter shaft to the reverse gear ratio selecting position and the reverse shifter shaft in turn pivots the shifter lever to move the reverse idler gear from a disengaged position to the reverse gear ratio engaging position. In the reverse gear ratio engaging position, the idler gear engages a pair of gears mounted in the transmission and effects reverse gear ratio. To yieldingly hold the reverse shifter shaft in the reverse gear ratio selecting position a spring urged detent ball engages a notch in the reverse shifter shaft. To positively prevent reverse jump out the reverse shifter shaft is provided with a non-concentric portion providing a step, and the hand lever and reverse shifter lever are offset from the reverse shifter shaft and arranged opposite each other. When the transmission is in reverse the step on the reverse shifter shaft is operable to bear against an abutment on the transmission housing to prevent movement of the idler gear to its neutral or the disengaged position by means of the reverse shifter shaft and reverse shifter lever. In reverse the step is engaged with and forced to bear against the abutment by utilizing the axial forces tending to urge the idler gear to the disengaged position to provide a moment of force acting on the reverse shifter shaft in a direction to engage the step with the abutment. When the transmission is shifted to neutral by the manual hand lever, the hand lever transmits a force which is utilized to provide a moment of force acting in the opposite direction to urge the step to clear the abutment and permit the reverse shifter shaft to pass freely to its neutral position.

An object of the invention is to provide in a transmission having gear shifter means for selectively effecting drives in a transmission gear set, means responsive to forces in the transmission gear set tending to urge disengagement of a drive ratio to maintain the gear shifter means in a position corresponding to engagement in the drive ratio.

Another object of the invention is to provide in a transmission, a positive lock for a shifter shaft responsive to forces in the transmission gearing tending to urge the shifter shaft out of a ratio selecting position to prevent jump out and selectively responsive to a controlled force to permit free movement from the ratio position.

Another object of the invention is to provide in a transmission a shift lever pivotally mounted to the transmission and operably engaging at its opposite ends a slidably mounted shifter shaft and a rotatably and slidably mounted idler gear and a hand lever movable between an engaged position and another position to move the shifter shaft and the idler gear through the shift lever between a ratio engaging position and another position, and lock means on the shifter shaft and transmission housing operable in response to a moment of force in one direction produced by forces from the transmission tending to urge the idler gear from the engaged to disengaged position to prevent movement of the shifter shaft and maintain the idler gear in the engaged position and responsive to a moment of force in the other direction produced by the hand lever to permit free movement of the shifter shaft when the hand lever is pivoted to move from the engaged position.

Another object of the invention is to provide in a transmission having a reverse shifter shaft, a reverse shifter lever pivotally mounted to the transmission and operably engaging at its opposite ends a slidably and rotatably mounted reverse idler gear and a pivotally mounted hand lever, the hand lever and reverse shifter lever being offset from the reverse shifter shaft and arranged opposite each other, and a non-concentric portion on the reverse shifter shaft providing a step operable to engage an abutment on the transmission in response to a moment of force produced by the axial loading in the transmission gear set in reverse gear ratio and in response to another moment of force produced by a force from the hand lever when the reverse shifter shaft is moved by the hand lever from reverse toward neutral to clear the abutment and permit free movement of the reverse shifter shaft.

These and other objects of the invention will be more apparent from the following description and drawings of the preferred embodiment.

Figure 1:
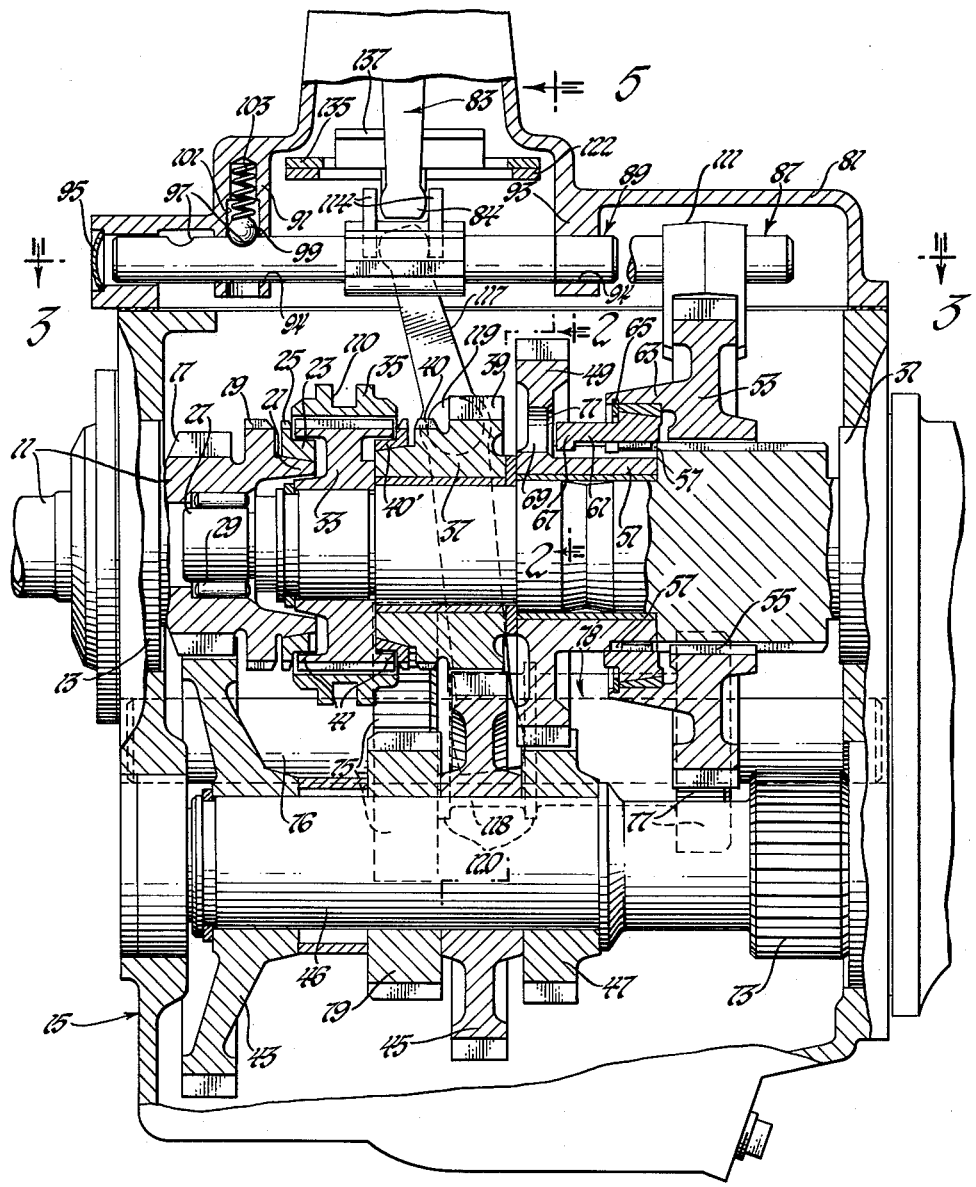
FIGURE 1 is a longitudinal sectional view through the transmission.

Referring to the drawings the transmission includes a clutch shaft 11 driven by the engine, not shown, and supported in a bearing 13 mounted in a transmission housing 15. Within the housing, shaft 11 carries gear teeth 17, a ring of clutch teeth 19 and the shaft ends in a tapered cone 21. A synchronizing cone 23 with teeth 25 is adapted to rotate on the surface of cone 21.

A transmission shaft 27 extends from a pilot bearing 29 within the end of shaft 11 to and through bearings 31 mounted in the rear wall of the housing. Rigid with shaft 27 is a ring 33 peripherally formed to slidably guide a clutch ring 35 having internal teeth. The internal teeth of the ring 35 selectively mesh with clutch teeth 25 and 19. Rotatably mounted on shaft 27 is a gear 37. As in the case of the end of shaft 11, gear 37 has gear teeth 39, clutch teeth 40 and a tapered end as shown together with a synchronizing cone 40' with clutch teeth. Between the two synchronizing cones and the ring 35 is a spring device 41 so positioned that when ring 35 is moved toward the engine end of the transmission the cone 23 serves to synchronize the rates of rotation so that the shaft 27 may be clutched without shock to rotate jointly with shaft 11.

Gear teeth 17 on shaft 11 constantly drive gear 43 keyed to a countershaft 46 journaled on the transmission walls as shown. A countershaft gear 45 is in constant mesh with gear teeth 39. When ring 35 is moved rearwardly it locks gear 37 to shaft 27 with the aid of the synchronizing means whereby shaft 11 drives shaft 27 at a speed ratio of less than unity called third speed. Fourth speed or direct drive is provided by moving ring 35 forward to clutch shaft 11 to shaft 27.

Figure 2:
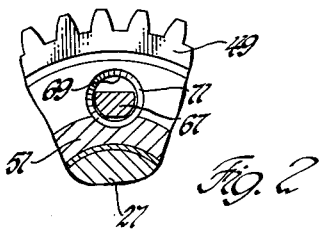
FIGURE 2 is a partial sectional view taken on the line 2—2 of FIGURE 1.

The countershaft carries a gear 47 in constant mesh with a gear 49, gear 49 with its hub 51 being rotatably supported on shaft 27. Slidable but non-rotatable on shaft 27 is a gear 53. It has internal teeth 55 adapted to engage external teeth 57 on the hub 51 of gear 49 when moved toward gear 49. A synchronizing ring 61 is carried with a forward extension 63 of gear 53 and retained by ring 65. There are the usual tapered faces on the gear extension and ring 61. Ring 61 has a plurality of axial extensions 67 shaped as shown in FIGURE 2. Gear 49 has apertures 69 one for the passage of each extension 67. As gear 53 moves forwardly the ring 61 is carried with it. If gears 49 and 53 have unlike rates of rotation the ends of extensions 67 engage on one side or the other of the tapered faces 71 leading into the apertures 69 and resist further movement until the frictional resistance between the tapered surfaces effects synchronization. Then the extensions 67 pass freely through the openings 69 and the teeth 55 and 57 engage. This second speed drive is therefore through gear train 17–43 and 47–49 the latter now locked to shaft 27.

Low or first speed is obtained by moving gear 53 toward the rear. It carries the synchronizing device with it, the latter having no function in connection with low speed. As it moves toward the rear, gear 53 slides into mesh with countershaft gear 73.

Reverse drive is effected by a reverse idler gear comprising a pair of spaced gears 75 and 77 formed on a sleeve member 78 which is rotatably mounted on a third or reverse idler shaft 76. The gears 75 and 77 rotate together and about shaft 76 and when these gears are moved jointly from left to right from a disengaging position to an engaged position as viewed in FIGURE 1, the gear 75 is made to mesh with a countershaft gear 79 and gear 77 to mesh with gear 53 as shown in FIGURE 1. Reverse drive is therefore through gear trains 17–42, 79–75 and 77–53.

Figure 3:
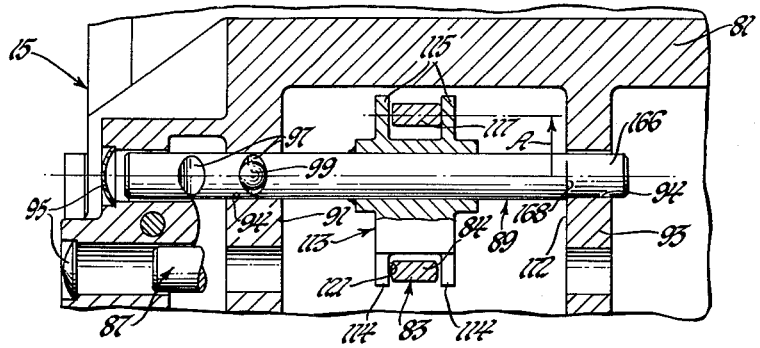
FIGURE 3 is a partial sectional view taken on the line 3—3 of FIGURE 1 showing the reverse shifter shaft in the reverse selecting position with the step in the engaged position.
Figure 4:
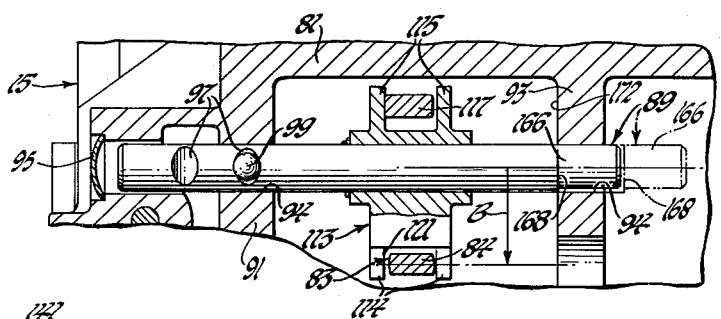
FIGURE 4 is a sectional view the same as FIGURE 3 showing the reverse shifter shaft in the reverse selecting position with the step in the disengaged position.
Figure 5:
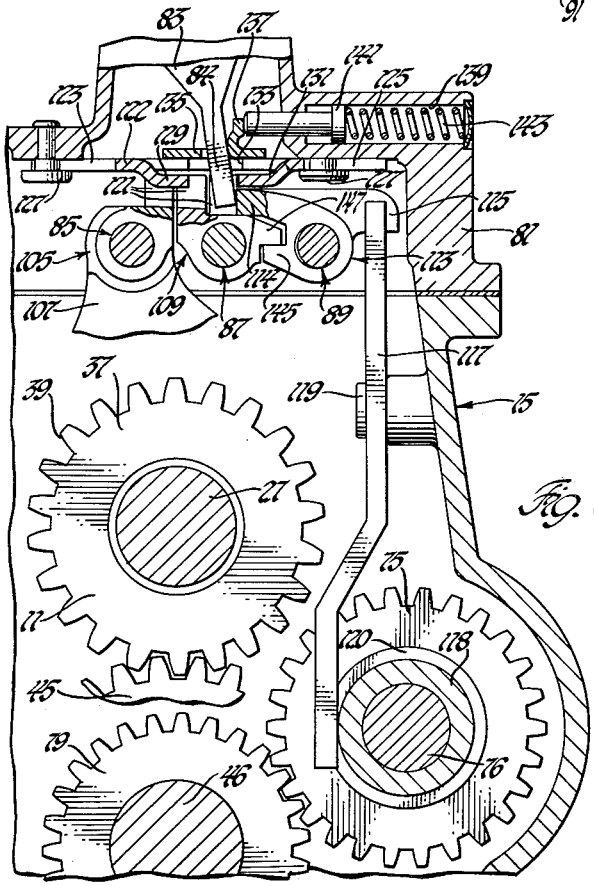
FIGURE 5 is a partial sectional view taken on the line 5—5 in FIGURE 1.

The mechanism for shifting the clutches and gears to obtain the several driving ratios is mounted in cover 81 of the transmission housing. Into the dome of the cover there projects a manually operable lever 83 having a conventional fulcrum, not shown, about which it pivots and a controlled or lower end portion 84. Within the cover are shifter shafts, rods or rails 85, 87, 89 as best shown in FIGURE 5. The cover is formed with wall portions or supports such as 91 and 93 having aligned bores 94 to guide these shafts as they reciprocate. Plugs 95 close bores or openings in the cover through which openings the shafts are assembled. This arrangement prevents loss of oil which might occur if the shafts were slidably supported in end walls of the casing. The shafts have notches 97 to receive detent balls 99 projecting from cover pockets 101 in wall portion 91 containing springs 103 to yieldably hold the shafts in positions of adjustment. The cover pocket containing the spring urged detent ball for shifter shaft 89 which is the reverse shifter shaft is located in wall portion 91 for reasons as will be subsequently explained and it is understood that the cover pockets containing the spring urged detent balls for shafts 85 and 87 could be located in wall portion 93. Carried by shaft 85 which is the third-fourth shifter shaft is a lever engaging head 105 and a fork 107 the lower end of which, not shown, is adapted to engage the groove 110 in ring 35. Shaft 87 which is the first-second shifter shaft carries a second lever engaging head 109 located adjacent head 105. Shaft 87 also carries a fork 111, axially spaced from head 109 and embracing gear 53. Shaft 89 carries a head 113 having a pair of axially spaced projections 114 directed laterally over shaft 87 and terminating adjacent head 109. Head 113 also has a pair of axially spaced projections 115 for operatively engaging the upper or controlling end of a shifter lever 117 pivoted to the housing by a pivot 119 with lever 117 having its lower or controlled end received with a groove 118 between lands 120 on the sleeve member 78. The three heads each have notches 121 to selectively receive the lower or controlled end portion 84 of lever 83 as it moves in one plane prior to being moved in a second plane to reciprocate one or another of the shifter shafts and engage the clutches or teeth as described. As best shown in FIGURES 3 and 4 the notch 121 of head 113 is the spacing between the projections 114.

The mechanism to prevent the shift of any other than the selected shifter shaft is a plate 122. It slides along an inner overlying cover surface of the cover 81 as best shown by FIGURE 4. It is guided by pins 127 projecting through slots 123 and 125 of the plate and extending into the cover, the heads of the pins serving as supporting means. The tongues 129, 131 of the plate are bent down into a plane below the plane of the plate. These tongues are dimensioned to slide into head notches 121. Plate 122 has a transverse slot 133 for the passage of the lower end of lever 83. Overlying and secured to plate 122 is another transversely slotted plate 135. The lever 83 passes through this slot. In one side of the slot of plate 135 is a bent up tongue 137. In a cover opening 139 there is slidably mounted a pin 141 backed by a spring 143. In that position of the change speed mechanism wherein the controlled end of the lever is in the notch in head 113 as shown by FIGURE 5, the tongue 137 bears against the end of pin 141 and the force of spring 143, and the tongue 129 on plate 122 is in the notches in heads 105 and 109 and locks shafts 85 and 87. In this position, shaft 89 can be moved to obtain reverse upon pivotal movement of the hand lever longitudinally of the transmission. When the controlled end of the lever is selectively moved to enter the notch of head 109 it moves plates 135 and 122 with it. Tongue 129 while remaining in the notch of head 105 leaves the notch in head 109 and the tongue 131 enters the notch in head 113. Thus shafts 85 and 89 are locked. Then lever 83 may be moved in the slot of plates 122 and 135 to move shaft 87 lengthwise of the transmission and engages the clutches for first speed or for second speed. If in the selecting movement the lever 83 is moved beyond the notch of head 109 when a shift to first or second speed is desired and into head 113 the tongue 137 engaging pin 141 resisted by spring 143 warns the operator of the excessive lever movement. When the controlled end of the lever is selectively moved to enter the notch of head 105, the plates 135 and 122 move with it. Tongue 131 remains in the notch in head 113 and enters the notch in head 109 while tongue 129 leaves the notch in head 105. Shaft 85 may then be moved to obtain third speed or fourth speed depending on its direction of movement.

It will be noticed that fork 111 embraces low speed driving gear 53. The rotation of this gear may tend to rotate fork 111 and its shaft 87 the more especially as some appreciable force is applied by the fork against the side of the gear in the act of synchronizing. Any such rotation might interfere with the free relationship between the head 109 and the interlock plate. To prevent any rotation of shaft 87 the fork 111 has a laterally extending fork, not shown, to straddle shaft 89. It is also necessary to prevent any axial rotation of shaft 89. FIGURE 5 shows that the heads 109 and 113 have extensions with overlying faces 145 and 147 so that the non-rotation of shaft 87 insured as explained above prevents by contact of parts of 109 and 113, any rotation of shaft 89. By this means the correct position of the interlocking plate 122 and the heads 109 and 113 is effected. Head 105 and shaft 85 cannot rotate because fork 107 embraces ring 35.

Figure 6:
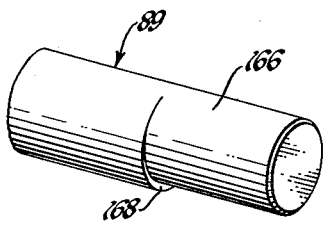
FIGURE 6 is a perspective of one end of the reverse shifter shaft showing the non-concentric portion.

To prevent reverse jump out, that is, to prevent the reverse idler gear which comprises gears 75 and 77 on sleeve member 78 from moving to the left from the position shown in FIGURE 1 which is the reverse ratio engaging position to a position corresponding to disengagement of reverse and neutral in the transmission, there is provided a non-concentric portion 166 on one end of the reverse shifter shaft 89. This non-concentric portion 166 is best shown in FIGURE 6 and provides a step 168 extending partially around the periphery of shaft 89. The bores 94 in the wall portions 91 and 93 which guide the reverse shifter shaft 89 and the opening through which the shifter shaft 89 is mounted are large enough to provide clearance at these points and the shifter shaft 89 to permit a limited degree of pivoting of the shaft 89 about the fulcrum provided by the detent ball as will be fully explained below.

When the transmission is in reverse as shown in FIG. 1 the step 168 is forced to bear against an abutment on the transmission housing provided by the face 172 of the wall portion or support 93 as best viewed in FIGURE 3 to prevent movement of shaft 89 to the right toward its disengaged or neutral selecting position. This is a result of the jump out forces being transmitted to the lower end of lever 117 by the walls of the groove. The jump out force in reverse from the transmission gearing acts in an axial direction to urge the reverse idler gear toward the engine end of the transmission or to the left and since this force acts to the left it acts upon the lower or controlled end of shifter lever 117 in the groove 118 tending to pivot lever 117 clockwise as viewed in FIGURE 1. Since the upper or controlling end of lever 117 is offset from the axis of shaft 89 by the effective distance A and the controlling end of lever 117 bears against the right-hand projection 115 of head 113 there is produced a clockwise moment of force about the detent ball 99 as viewed in FIGURE 3 having a moment arm A. The aforementioned clearances provided between the bores receiving shaft 89 are large enough to permit shaft 89 to pivot clockwise as viewed in FIGURE 3 about detent ball 99 to a position where step 168 lies opposite of and abuts with face 172 of the wall portion 93 thus preventing movement of shaft 89 to the right which is the reverse jump out direction for the reverse shifter shaft 89. When the transmission is to be shifted from reverse to neutral the end portion 84 of the lever 83 engages the right-hand projection 114 of head 113 as best viewed in FIGURE 4 and since the end portion 84 is offset from the axis of shaft 89 by the effective distance B in a direction opposite the offset of the controlling end of lever 117 the force transmitted to the right-hand projection 114 produces a moment of force having a moment arm B acting on shaft 89 in the opposite direction or counterclockwise about the detent ball 99. This acts to rotate shifter shaft 89 counterclockwise thus clearing step 168 of the face 172 of wall portion 93 and permits shaft 89 to pass freely through wall portion 93 to the neutral position shown by the dashed lines.

The above-described preferred embodiment is illustrative of the invention and it will be appreciated that it may be modified within the scope of the appended claims.

I claim:
1. In a transmission,
(a) a housing,
(b) input and output means rotatably mounted in said housing,
(c) drive train means including gear drive means operable to connect said input means to said output means and to effect different drive ratios therebetween,
(d) manually operable means operatively connected to said drive train means for operating said drive train means to selectively connect said input means to said output means through said different drive ratios and to disconnect said input means from said output means,
(e) and locking means responsive to a force produced by said gear drive means in one drive ratio to lock said manually operable means to said housing to maintain connection of said input means to said output means through said one drive ratio and being responsive to a control force from said manually operable means to permit disconnection of said input means from said output means.

2. In a transmission,
(a) a housing,
(b) input and output means rotatably mounted in said housing,
(c) drive train means including gear drive means operable to connect said input means to said output means and to effect different drive ratios therebetween,
(d) manually operable means including shifter means slidably mounted in said housing operatively connected to said drive train means for operating said drive train means to selectively connect said input means to said output means through one of said drive ratios upon movement of said shifter means to a first position and to disconnect said input means from said output means upon movement of said shifter means to a second position,
(e) and engaging means on said shifter means and said housing responsive to a force produced by said gear drive means in said one drive ratio to engage with each other to lock said shifter means in said first position to maintain connection of said input means to said output means through said one drive ratio and being responsive to a control force from said manually operable means to unlock said shifter means for movement to said second position to permit disconnection of said input means from said output means.

3. In a transmission,
(a) a housing,
(b) input and output means rotatably mounted in said housing,
(c) drive train means including gear drive means operable to connect said input means to said output means and to effect different drive ratios therebetween,
(d) manually operable means including shifter means mounted in said housing for slidable movement and limited pivotal movement operatively connected to said drive train means for operating said drive train means to selectively connect said input means to said output means through one of said drive ratios upon slidable movement of said shifter means to a first position and to disconnect said input means from said output means upon slidable movement of said shifter means to a second position,
(e) engaging means on said shifter means and said housing operable to engage each other in said first position of said shifter means to lock said shifter means in said first position to maintain connection of said input means to said output means through said one drive ratio upon pivotal movement of said shifter means in one direction in response to a moment of force acting on said shifter means in said one direction produced by a force from said gear drive means in said one drive ratio, (f) and said means on said shifter means and said housing being operable to disengage from each other in said first position of said shifter means to unlock said shifter means for movement to said second position to permit disconnection of said input means from said output means upon pivotal movement of said shifter means in the opposite direction in response to a moment of force acting on said shifter means in said opposite direction produced by a controlled force from said manually operable means.

4. In a transmission,
(a) a housing,
(b) input and output means rotatably supported in said housing,
(c) drive train means including gear means mounted in said housing operable to connect said input means to said output means and effect different drive ratios therebetween,
(d) lever means supported by said housing for pivotal movement having a controlled and a controlling portion,
(e) said controlled portion of said lever means operatively connected to said drive train means and operable when pivoted in one direction to selectively connect said input means to said output means through one of said drive ratios and when pivoted in the opposite direction to disconnect said input means from said output means,
(f) a hand lever supported by said housing for pivotal movement having a controlled portion,
(g) shifter means supported by said housing for slidable movement between a neutral position corresponding to said input means being disconnected from said output means and a drive selecting position corresponding to said input means being connected to said output means through said one drive ratio,
(h) said shifter means being supported by said housing for limited pivotal movement,
(i) said shifter means having means operatively connected to said controlled portion of said hand lever and said controlling portion of said lever means whereby when said hand lever is pivoted in one direction said shifter means is slidably moved to said drive selecting position and said lever means is pivoted to connect said input means to said output means through said one drive ratio and when said hand lever is pivoted in the opposite direction said shifter means is slidably moved to said neutral position and said lever means is pivoted to disconnect said input means from said output means,
(j) abutment means on said housing,
(k) said shifter means having step means arranged relative to said abutment means when in said drive selecting position whereby said step means is operable to engage said abutment means to lock said shifter means in said drive selecting position upon pivotal movement of said shifter means in one direction in response to a moment of force acting on said shifter means produced by axial loading forces in said gear means transmitted by said controlling portion of said lever means,
(l) and said step means being operable to disengage from said abutment means to unlock said shifter means from said drive selecting position to permit movement to said neutral position upon pivotal movement of said shifter means in the opposite direction in response to a moment of force acting on said shifter means produced by a force transmitted by said controlled portion of said hand lever.

5. In a transmission,
(a) a housing,
(b) input and output means rotatably supported in said housing,
(c) drive train means including gear means mounted in said housing operable to connect said input means to said output means and effect different drive ratios therebetween,
(d) lever means supported by said housing for pivotal movement having a controlled and a controlling portion,
(e) said controlled portion of said lever means operatively connected to said drive train means and operable when pivoted in one direction to selectively connect said input means to said output means through one of said drive ratios and when pivoted in the opposite direction to disconnect said input means from said output means,
(f) a hand lever supported by said housing for pivotal movement having a controlled portion,
(g) shifter means supported by said housing for slidable movement between a neutral position corresponding to said input means being disconnected from said output means and a drive selecting position corresponding to said input means being connected to said output means through said one drive ratio,
(h) said shifter means being supported by said housing for limited pivotal movement,
(i) said shifter means having means operatively connected to said controlled portion of said hand lever and said controlling portion of said lever means whereby when said hand lever is pivoted in one direction said shifter means is slidably moved to said drive selecting position and said lever means is pivoted to connect said input means to said output means through said one drive ratio and upon pivotal movement of said hand lever in the opposite direction said shifter means is slidably moved to said neutral position and said lever means is pivoted to disconnect said input means from said output means,
(j) said controlled portion of said hand lever and said controlling portion of said lever means being on opposite sides of said shifter means,
(k) abutment means on said housing,
(l) said shifter means having step means arranged relative to said abutment means when in said drive selecting position whereby said step means is operable to engage said abutment means to lock said shifter means in said drive selecting position upon pivotal movement of said shifter means in one direction in response to a moment of force acting on said shifter means produced by a force transmitted by said controlling portion of said lever means,
(m) and said step means being operable to disengage from said abutment means to unlock said shifter means from said drive selecting position to permit movement to said neutral position upon pivotal movement of said shifter means in the opposite direction in response to a moment of force produced by a force transmitted by said controlled portion of said hand lever.

6. The invention defined in claim 5 and said shifter means including a shaft and said step means being provided by a non-concentric portion on said shaft.

7. In a transmission,
(a) a housing,
(b) input and output means rotatably supported in said housing,
(c) drive train means including gear means mounted in said housing operable to connect said input means to said output means and effect different drive ratios therebetween,
(d) lever means supported by said housing for pivotal movement having a controlled and a controlling portion,
(e) said controlled portion of said lever means operatively connected to said drive train means and operable when pivoted in one direction to selectively connect said input means to said output means through one of said drive ratios and when pivoted in the opposite direction to disconnect said input means from said output means, (f) a hand lever supported by said housing for pivotal movement having a controlled portion, (g) a shifter shaft supported by said housing for slidable movement between a neutral position corresponding to said input means being disconnected from said output means and a drive selecting position corresponding to said input means being connected to said output means through said one drive ratio, (h) a spring biased detent ball mounted in said housing co-operating selectively with notches on said shifter shaft to yieldingly hold said shifter shaft in each of said positions, (i) said shifter shaft being capable of limited pivotal movement about said detent ball in said drive selecting position, (j) said shifter shaft having means operatively connected to said controlled portion of said hand lever and said controlling portion of said lever means whereby when said hand lever is pivoted in one direction said shifter shaft is slidably moved to said drive selecting position and said lever means is pivoted to connect said input means to said output means through said one drive ratio and upon pivotal movement of said hand lever in the opposite direction said shifter shaft is slidably moved to said neutral position and said lever means is pivoted to disconnect said input means from said output means, (k) said controlled portion of said hand lever and said controlling portion of said lever means being on opposite sides of said shifter shaft, (l) abutment means on said housing, (m) said shifter shaft having a non-concentric portion providing step means arranged relative to said abutment means when in said drive selecting position whereby said step means is operable to engage said abutment means to lock said shifter shaft in said drive selecting position upon pivotal movement of said shifter shaft about said detent ball in one direction in response to a force acting on said shifter shaft transmitted by said controlling portion of said lever means, (n) and said step means being operable to disengage from said abutment means to unlock said shifter shaft from said drive selecting position upon pivotal movement of said shifter shaft about said detent ball in the opposite direction in response to a force acting on said shifter shaft transmitted by said controlled portion of said hand lever.

References Cited by the Examiner

UNITED STATES PATENTS

| | | | |
|---|---|---|---|
| 2,080,091 | 5/1937 | Peterson | 74—343 |
| 2,440,775 | 5/1948 | Land | 74—325 |
| 3,110,191 | 11/1963 | Schulze | 74—333 |

DON A. WAITE, *Primary Examiner.*